(12) United States Patent
Wallace

(10) Patent No.: US 11,086,730 B2
(45) Date of Patent: *Aug. 10, 2021

(54) SNAPSHOT MANAGEMENT

(71) Applicant: Zetta, LLC, Dover, DE (US)

(72) Inventor: Charles Michael Wallace, San Jose, CA (US)

(73) Assignee: Zetta, LLC, Sunnyvale, CA (US)

( * ) Notice: Subject to any disclaimer, the term of this patent is extended or adjusted under 35 U.S.C. 154(b) by 275 days.

This patent is subject to a terminal disclaimer.

(21) Appl. No.: 16/163,935

(22) Filed: Oct. 18, 2018

(65) Prior Publication Data
US 2019/0138396 A1    May 9, 2019

Related U.S. Application Data

(63) Continuation of application No. 14/555,262, filed on Nov. 26, 2014, now Pat. No. 10,140,188.

(51) Int. Cl.
| | | |
|---|---|---|
| *G06F 16/00* | (2019.01) | |
| *G06F 11/14* | (2006.01) | |
| *G06F 16/11* | (2019.01) | |
| *G06F 11/10* | (2006.01) | |

(52) U.S. Cl.
CPC ...... *G06F 11/1461* (2013.01); *G06F 11/1076* (2013.01); *G06F 11/1451* (2013.01); *G06F 16/128* (2019.01); *G06F 11/1456* (2013.01); *G06F 11/1466* (2013.01); *G06F 2201/84* (2013.01)

(58) Field of Classification Search
CPC .......... G06F 11/1451; G06F 11/1456; G06F 11/1466; G06F 11/1076; G06F 16/128; G06F 11/1461; G06F 2201/84
See application file for complete search history.

(56) References Cited

U.S. PATENT DOCUMENTS

| | | | | |
|---|---|---|---|---|
| 9,632,874 | B2 * | 4/2017 | Pawar | G06F 11/1456 |
| 9,639,426 | B2 * | 5/2017 | Pawar | G06F 9/45504 |
| 2010/0077160 | A1 * | 3/2010 | Liu | G06F 11/1453 |
| | | | | 711/162 |
| 2012/0124105 | A1 * | 5/2012 | Provenzano | G06F 11/1453 |
| | | | | 707/813 |
| 2012/0124307 | A1 * | 5/2012 | Ashutosh | G06F 11/1456 |
| | | | | 711/162 |
| 2013/0036091 | A1 * | 2/2013 | Provenzano | G06F 16/1844 |
| | | | | 707/624 |
| 2013/0110779 | A1 * | 5/2013 | Taylor | G06F 16/1844 |
| | | | | 707/624 |
| 2015/0212893 | A1 * | 7/2015 | Pawar | G06F 9/445 |
| | | | | 707/649 |
| 2015/0212894 | A1 * | 7/2015 | Pawar | G06F 11/1469 |
| | | | | 707/679 |
| 2015/0212895 | A1 * | 7/2015 | Pawar | G06F 11/1451 |
| | | | | 707/649 |

(Continued)

*Primary Examiner* — Shiow-Jy Fan
(74) *Attorney, Agent, or Firm* — Black, McCuskey, Souers & Arbaugh LPA

(57) ABSTRACT

Systems and methods are disclosed for backing up a computer. The method includes choosing a time window to back up the computer; determining jobs that need to be synced during the time window and snapshots; determining an optimal set of snapshots that cover all jobs; altering job records in the database to point to one of the optimal snapshots; and deleting all snapshots not in the optimal set.

15 Claims, 8 Drawing Sheets

(56) References Cited

U.S. PATENT DOCUMENTS

2015/0212896 A1* 7/2015 Pawar .................. G06F 16/128
707/648
2015/0212897 A1* 7/2015 Kottomtharayil ....... G06F 11/00
714/20

* cited by examiner

| |
|---|
| Determine start and end of time window (402) |
| Get all available post-sync snapshots created during that time window (404) |
| Get all job syncs that started and/or ended during that time window (406) |
| Match snapshots to the sync jobs that triggered them (408) |
| For each snapshot, look at each job, and find the last job sync that ended that it covers before the next job sync began. This provides a list of which snapshots cover which job syncs (410) |
| Order job syncs by how many snapshots cover them, from least to most (412) |
| Make a checklist of all job syncs (414) |
| While there are unchecked job syncs (416) |
|     For each unchecked job sync, starting with the least-covered job sync, continuing for all job syncs with the same level of coverage, get all covering snapshots (418) |
|     Of those, record the snapshot that covers the most job syncs (440) |
|     For each job sync that the snapshot covers, check it off the list (422) |
| For each job sync database row that isn't already pointing to one of the recorded snapshots, get the snapshots that cover its job sync, then pick the one (or one of several) that is in the recorded set, and update the row to point to the recorded snapshot (424) |
| For each snapshot not in the recorded set, delete the snapshot (428) |

FIG. 4

|   | A | B | C | D | E1 | E2 | F |
|---|---|---|---|---|----|----|---|
| A | X |   |   |   | X  |    |   |
| B | X | X |   |   | X  |    |   |
| C |   |   | X | X | X  |    | X |
| D |   | X | X | X | X  |    |   |
| E1|   |   |   |   | X  |    |   |
| E2|   |   | X | X |    | X  | X |
| F |   |   |   | X | X  |    | X |
|   | 2 | 2 | 3 | 4 | 6  | 1  | 3 |

Snapshots (rows); # of Snapshots that cover each Job Sync (columns)

FIG. 5B

SNAPSHOT MANAGEMENT

FIELD OF INVENTION

The invention relates to systems and methods for disaster recovery and/or maintaining back up files for servers on a computer network.

BACKGROUND OF THE INVENTION

Today most backup systems operate by having the network administrator identify a time of day during which little or no network activity occurs. During this time the network administrator turns the network over to a backup system and the data files stored on the computer network are backed up, file by file, to a long term storage medium, such as a tape or hard drive backup system. Computer backups are performed using several strategies. The simplest entails a complete transfer of all data and meta-data (such as time stamps, ownership, and access rights) to a target which is simple but redundantly transfers data already present on the target at potential high expense. Incremental backups transferring actual changes or a more manageable subset are also possible. Common mechanisms for determining an appropriate increment include archive bits and modification time stamps. Archive bits are set by the operating system on any change and reset by the backup software but preclude use for multiple backup systems and don't narrow down the types of change. Modification time stamps are set by the operating system but can sometimes be adjusted by user software.

A full backup of a large data set may take a long time to complete. To avoid downtime, high-availability systems may instead perform the backup on a snapshot—a read-only copy of the data set frozen at a point in time—and allow applications to continue writing to their data. Most snapshot implementations are efficient and can create snapshots in O(1). In other words, the time and I/O needed to create the snapshot does not increase with the size of the data set; by contrast, the time and I/O required for a direct backup is proportional to the size of the data set. In some systems once the initial snapshot is taken of a data set, subsequent snapshots copy the changed data only, and use a system of pointers to reference the initial snapshot. This method of pointer-based snapshots consumes less disk capacity than if the data set was repeatedly cloned. However, in today's high speed environment, each computer can create many overlapping snapshots with different job runs, which take up disk space and slow accesses down.

SUMMARY

In one aspect, a method for backing up a computer includes choosing a time window to back up the computer; determining jobs that need to be synced during the time window and snapshots; determining an optimal set of snapshots that cover all jobs; altering job records in the database to point to one of the optimal snapshots; and deleting all snapshots not in the optimal set.

Advantages of the system may include one or more of the following. The system supports off-site storage of critical data. Other advantages may include one or more of the following. The system provides security, backup time, management and most important, recovery time. The system uses the cloud and client to cloud communications agents using the Web Distributed Authoring and Versioning (WebDAV) extension to the HTTP protocol. WebDAV allows communications between customer equipment and the cloud data centers to be done in a rapid multi-thread mode which allows the full available customer bandwidth to be utilized, shrinking backup and recovery time at the protocol level. In addition, data is de-duplicated and compressed prior to transmission, further reducing backup and recovery time. A local copy of a file version fingerprint is kept on the customer equipment which can be used to quickly determine if file data has changed. Incremental change data is transmitted to the cloud, further reducing transmission times. The system is highly secure and security starts with encryption of data prior to transmission and at rest. Since businesses will different views of IT's involvement in the recovery process of entire systems or a particular file version, lightweight directory access protocol (LDAP) is used to determine who has privileges to access what. An administrator can establish the service with LDAP for the customer defaults to that admin for access to the customer data. After that, and depending on how much care and feeding the IT organization wants to donate to the process, it is possible for end users to be able to access and recover data that is, for example, on their personal laptop. Protection technology is automated with configurable frequency and retention settings. Because of the communications efficiencies, the expense and management of a dedicated backup appliance is not necessary. It takes about fifteen minutes to set up and establish the service. In case of a disaster, the data is instantly available via a web browser interface. The same interface is used to manage all machines via a single pane. The system makes cloud data protection and disaster recovery feasible for the mid-market with compelling features, no capital expense and low, predictable operating expenses.

Yet other advantages of the system may include one or more of the following. The system provides on demand storage—immediately scale according to a user's growth, compliance and user needs. The system provides a real file system backend—replication allows for mounting. A standards based file protocol access is used. The system is secure—encryption end-to-end from the user's location to the system. Data received is hashed on receipt and verified while stored with the system. Users can access native file system data directly without complicated restore process. The system is fast and can move data efficiently, leading to reduced backup windows. The system can perform fast change detection, and the WAN-optimized software-based data mover includes bandwidth efficiency throttling. Sub-file change detection can be done, and strong checksums are kept on every file. Reverse incremental backup can be done through a series of full backups that are fully versioned. Snapshots are kept for recovery point objectives (RPO), retention schedules and compliance requirements. Through block level snapshot deltas and sub file change detection, the system is very space efficient. Features include:

Automated—'set and forget' protection
Automatic upgrades
Multi-platform support including Windows, Linux and MAC systems
Near instant deployment—A fully SAS based model allows customers to start protecting data within minutes
Managed Service—24/7/365—The system services team proactively managing the data protection
The system utilizes award-winning technology and infrastructure:
Web-based System Management Portal (SMP) to manage, configure and report on data protection jobs
Central View—Web-based single view across all data protection targets—remote locations, servers, end-users Geographically diverse data centers to select from SAS 70 Type II audited service, technology and datacenters Native connectors—Enterprise connectors for Databases Netapp replication Additional advantages of the system may include complete data protection to small and mid-sized companies by delivering each of the four components of data protection: online backup, disaster recovery, offsite data storage, and compliance. Online backup is a simple and automated way to backup the company's servers and laptops and is the first piece of the data protection puzzle. With the system, incremental backups are completed quickly thanks to de-duplication and multi-threaded data transfer over https. Disaster recovery is an important part of data protection—since backups are worthless if they can't be recovered. With the system's snapshot & replication approach, single files are just as easy to recover as whole file systems or databases. Offsite data storage is another component of data protection that ensures data loss in the data center or company headquarters doesn't also corrupt or destroy backup data. The system allows you an even greater level of data protection with the option to have the data replicated in both West Coast and East Coast data centers.

The system has three disaster recovery solutions built-in. To recover data an IT professional can use: the software client, a web browser, or a mapped network drive. To recover with the software agent simply use the "Restore Using The system Mirror" option when you right click on a file or directory from the admin interface. This is the most frequently used of the system's disaster recovery solutions. The web-based recovery will be the first of the disaster recovery solutions on the priority list if the data center has been damaged by a fire or tornado, for example. All it requires is logging into the system management portal, selecting the system you want to restore, then the snapshot of that system you want, and then click the blue URL link. A list of files for that system will then load in a new browser tab. Mapped network drive based disaster recovery solutions are built into the operating system such as Windows Vista and Windows 7.

BRIEF DESCRIPTION OF THE DRAWINGS

FIGS. 3-4 show exemplary processes for snap-shot management.

FIGS. 5A-5B show exemplary diagrams relating to snap-shot management.

DESCRIPTION

Figure 1A:
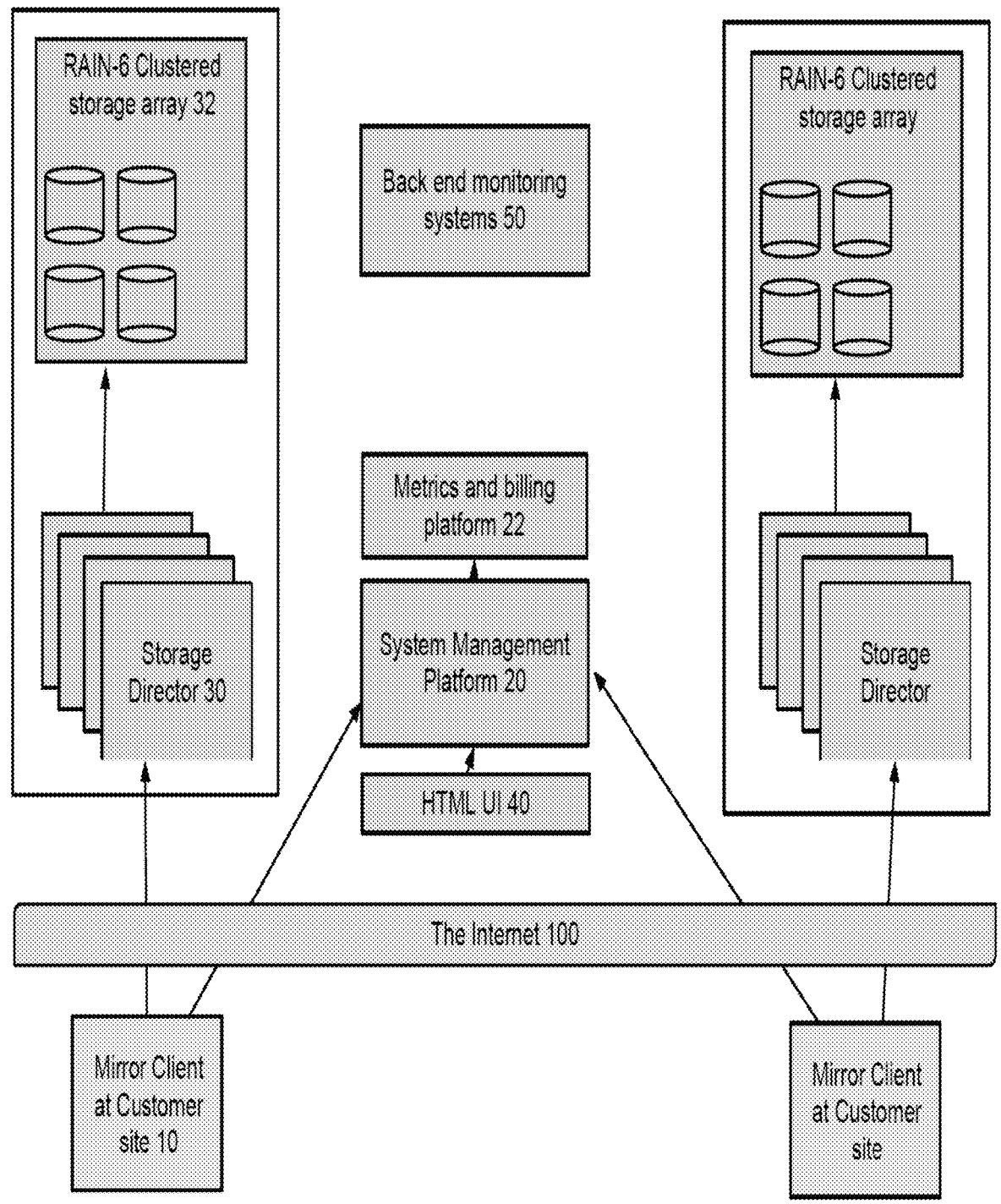
FIGS. 1A-1B show exemplary disaster recovery and back-up systems.

FIG. 1A shows an exemplary disaster recovery and back-up system. The system includes a plurality of client software 10. The software 10 runs natively on customer systems and interfaces directly with the user's computer file system. The software 10 is able to perform network file reads and writes, change detection, snapshots, database serialization and many more backup and restore functions and is remote controlled by the a System Management Platform 20 service over the Internet 100.

The configuration of the client software 10 is done using a web user interface 40. Once configured, the client software 10 communicates over the Internet 100 to the System Management Platform (SMP) 20 that acts as a central director for all activities. Configuration and user monitoring of the overall system is performed there through an overlaid HTML UI 40. Once configured the SMP 20 interfaces with agents at the client software 10 to initiate backup and restore jobs and other associated tasks. The web interface 40 can be an HTML UI that interfaces with the System Management Platform 20 and allows users to interact with the SMP 20 with a web browser to configure, monitor and manually initiate jobs. The HTML UI also acts as a central gateway to other HTML interfaces such as a Web File Browser hosted on the application servers.

Back up data from the client's computer is provided to storage directors 30 that send the information to a data storage array 32. A metrics and billing platform 22 communicates with the system management platform 32 to bill customers. A back end monitoring system 50 ensures that systems operate with a predetermined uptime.

One embodiment provides cloud backup security features such as:

1. The data is encrypted both in transit and at rest.

2. The data is stored using RAIN-6 (Redundant Array of Independent Nodes) that ensure that even if two entire storage nodes go down, not just two disks, the data is still available.

3. File level hashing to validate that all the data is free of corruption so it can be restored when needed.

4. Storage in SAS70 Type II data centers under audited service procedures.

5. Data immutability and preservation procedures for compliance with regulations such as SEC Rule 17-4a.

6. Service Auditors to the Statements on Standards for Attestation Engagements No. 16 (SSAE-16) certified service 7. User and group level access control to limit data access.

8. Authentication and logging of all access to data.

Figure 1B:
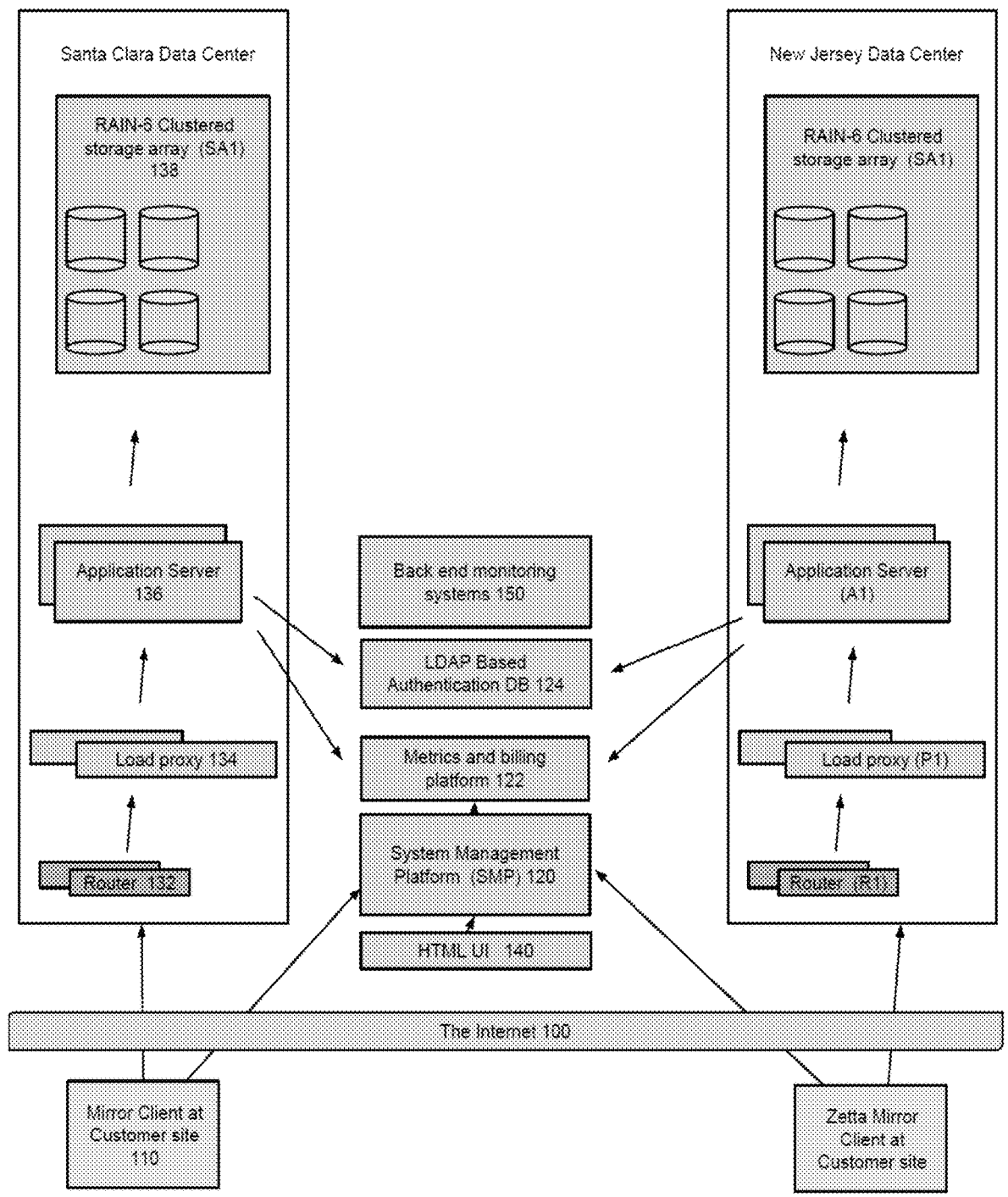

FIG. 1B shows a second embodiment of the disaster recovery and backup system.

In this system a plurality of data centers are provided to provide high availability. Each data center has routers 132 that communicate to load proxy machines 134 to distribute incoming requests to a plurality of application servers 136. In one embodiment, the routing infrastructure is based on 10G technology and is redundant at every level. In this embodiment, Load Proxy servers 134 receive incoming requests, validate the credentials in the request against LDAP, and route them to the application server that hosts the volume. Proxies are deployed as HA pairs. HTML based applications can be hosted here to provide seamless access for the user using a web browser.

The servers 136 communicated with a clustered storage array 138. The application servers 136 handle the bulk of the system load by providing a file system interface to the underlying data storage system 138. Most file system functions are provided through a WebDAV interface, but several custom additions were necessary to optimize the services. The application server also includes SSD for read cache acceleration. Application servers are deployed in HA pairs, and "own," one or more pools of disks, from which volumes are thin-provisioned.

Client software 110 communicates with the router 132. For management, the client software 110 also communicates with a system management platform (SMP) 120, which is controlled over a web interface 140. A metrics and billing platform 122 receives usage inputs from the application servers 136 and the SMP 120. In one embodiment, the Metrics and billing platform 122 is a custom client/server software built upon traditional SQL DB technologies. Frequent samples of storage metrics are saved and are available for instant and historical analysis over any time period. The system has custom built the billing metrics systems using traditional SQL database methodology to produce a very reliable yet scalable system. A scalable and customizable billing infrastructure is used that allows the system to take advantage of a large number of flexible subscription billing features. An LDAP based authentication database 124 also receives input from the application servers 136. The LDAP servers store and authenticate users for every transaction.

A back end monitoring system 150 ensures that systems operate with a predetermined uptime. The monitoring system 150 includes automated programs that monitor the health of thousands of individual hardware and software elements within the system. In one embodiment, an anonymous search operation is done in a root directory of each server every ten seconds. In another embodiment, Directory Proxy Server 6.0 has a number of properties that can be configured to monitor its backend servers. In yet other embodiments, the monitoring system 150 includes a TCP health monitor that interacts with the TCP port associated with the application and verify that a connection could be made, signifying that an application was running and listening for users. A typical example would be to attempt to attach to TCP port 80 of a web server. A successful connection to the appropriate port indicates server health that is better than a simple network PING that an application listens on the server.

In one implementation, the data storage array 32 is a RAIN-based storage and protection systems that includes RAIN nodes, IP-based internetworking, and RAIN management software. The RAIN nodes can be 1 U servers that provide about 1 terabyte of serial ATA (SATA) disk storage capacity, standard Ethernet networking and CPU processing power to run RAIN and data management software. Data is stored and protected reliably among multiple RAIN nodes instead of within a single storage subsystem with its own redundant power, cooling and hot-swap disk-drive hardware. The RAIN nodes are physically interconnected using standard IP-based LANs, metropolitan-area networks (MAN) and/or WANs. This lets administrators create an integrated storage and protection grid of RAIN nodes across multiple data centers. With MAN and WAN connectivity, RAIN nodes can protect local data while offering off-site protection for data created at other data centers. The RAIN management software lets RAIN nodes continuously communicate their assets, capacity, performance and health among themselves. RAIN management software automatically can detect the presence of new RAIN nodes on a new network, and these nodes are self-configuring. The management software creates virtual pools of storage and protection capacity without administrative intervention. It also manages all recovery operations related to one or more RAIN nodes becoming unavailable because of RAIN node or network failures. RAIN nodes do not require immediate replacement upon component failure because lost data is automatically replicated among the surviving RAIN nodes in the grid.

In one embodiment, the data storage array 32 or 138 is a RAIN-6 clustered storage array. The redundant Array of Independent Nodes (RAIN) architecture enables the system to have an entire node of disks or up to 50% of hard drives fail without experiencing any difficulty or system failure. RAID focuses on protecting hard drives from failure, while RAIN focuses on protecting the entire node, or server, cluster from failure. With RAIN technology not only are systems protected from a single hard drive failure, but also are protected from other hardware failures such as power supply, mother board, CPU, RAM or any other internal component. RAIN technology can protect up to 50% (n/2n) of the hard disk involved across all connected nodes. As more nodes are added the fault tolerance of the entire node cluster increases. More nodes mean higher performance and availability and increased scalability. High performance is realized by writing data first to Solid State Drives then to the SATA Drives.

On exemplary cluster architecture is built on the clustered file system and enables multiple engine nodes to share volumes on a group of SAN devices and provides a global naming system, which evenly distributes access requests onto the engine nodes by running a load balance algorithm. It also provides a set of file lockout mechanisms, ensuring that all engine nodes can access data on the same volume. The cluster architecture and load balance design eliminate risks from node failures, so even when a server in a data center fails, data access service is uninterrupted.

With RAIN architecture, independent servers in the cloud make complete copies of the user's data. This data is protected because it is copied from machine to machine in the cloud and the servers check that each copy is perfect. If one of those servers fails, user data does not disappear. The others detect the loss and make additional copies through a process called regeneration. Most storage systems use a different architecture, known as RAID, or Redundant Array of Inexpensive/Independent Disks. The RAID method does something similar to RAIN, but at the disk or machine level. The advantage with the RAIN architecture of the cloud is that it is much more scalable: Protection is happening at the server level, not down at the disk level. The RAIN method is also more reliable. An entire node could fail, but a user would still have access to his or her data because it would be replicated on additional nodes.

The three components of the online server backup are the backup itself, system snapshots, and replication of the data offsite. The system's server backup solution uses the lightweight client software, with specific plugins for file servers, Exchange, SQL, and VMware and multi-platform support for 18 different flavors of Windows, Linux, and Mac. Server backup using the client software enables automated incremental backups with configurable retention settings.

Snapshots are Versioning-Enabled Backup copies that capture the state of the data at a point in time. Snapshots allow for server backup with a consistent backup state across the entire system, with granular versioning. The system's snapshots use byte-level change detection to optimize the amount of data being transferred across the network during each daily server backup job.

The system pairs snapshots with replication to provide the most efficient disaster recovery capability. Rather that storing the snapshots compressed, or in a proprietary format, replication makes the backup a fully instantiated file system—in its native format—so disaster recovery becomes as easy as pulling a file off a file server.

The system may be integrated into a conventional computer network system that comprises conventional network elements and nodes such as client stations, work stations, printers, hubs, routers, and other conventional data network equipment. For example the depicted servers may be conventional files servers of the type commonly employed with computer networks and can comprise a PC compatible work station running the windows NT, UNIX, Linux, or other operating system and having sufficient random access memory and persistent memory to operate efficiently as a server systems. Similarly, the client station can be a conventional client workstation such as a PC compatible computer system running the windows 8, Linux, or UNIX operating system or any suitable operating system. Additionally, the client station can comprise an alternative client system such as a hand-held device, a standalone client system such as kiosks, or any other suitable client device. In FIG. 1 the network is the Internet, but can also be a local area network, however it will be apparent to one of ordinary skill that the systems and methods described herein can be employed with wide area network, a distributed network, including the Internet or any other suitable network system.

It will be understood by those of skill in the art, that these data storage device element may be conventional database systems, as well as conventional file systems, such as the Windows file system, or the Unix File system, both of which have directories of data file that may be backed up by the systems described herein. Moreover, the backup systems described herein will operate with data storage devices that store different formats of data and different types of files. For example, the data storage devices may store data files, executable files, registry information, database structures and other conventional data formats and data types. Moreover, FIG. 1A shows these stores of data as local to the server, however, it will be understood that such data stores may also be distributed across a plurality of locations and devices. The data may be physically stored on any suitable memory system including a cache memory system, a random access data memory, or a persistent data memory, such as a hard disk drive, RAID system, tape drive system, floppy diskette, or any other suitable system. The system depicted in FIG. 1A depicts the data storage devices as physically separate from the servers, however, it will be understood by those of ordinary skill in the art that in other embodiments the data storage devices can be integrated into the system, such as an internal hard drive device.

The system can also work with a tape library which may be a conventional tape library system of the type commonly employed for backing up data on a computer network. In one particular embodiment, the tape library system is a blank tape library system manufactured by the Quantum corp. of Milpitas, Calif. However, it will be apparent to those of ordinary skill in the art that other tape library systems may be employed without departing from the scope of the invention. Optionally, the tape library may include a controller that performs a tape expiration process to rotate selectively the use of tapes in the library and which is based on the loader capacity of the tape library. Specifically backup of data to the automated tape library, which can be a conventional juke box device that, can happen in a manner wherein after multiple or incremental system backups, essentially all available tape space is employed. Thus there is no more blank tape available for recording information. Rather than have a human remove the tape, and automatically reuse the oldest tape, the systems and methods described herein can operate the library to provide for continuous tape back up. In this practice, data sent over the network to the library may employ a tape expiration technique wherein the tape holding or storing the oldest data is employed by the system for storing new data into the library. The controller to implement this process may be a software process operating on the back up server, that is capable of recording which tape in the library has been employed for storing data and at what time the data was stored. The controller may store data onto each tape until the tape is full, or incapable of taking new data. Once this occurs, the controller may determine if any tapes in the library are blank and available for storing data. If so the controller can select the blank tape for receiving data. Otherwise, the controller can compare the time information for each tape to identify the tape having the oldest data. That tape may then be selected by the controller for storing data. It is important to understand that although FIG. 1A depicts the system as having a single library, a plurality of tape libraries may also be employed. Accordingly, the expiration strategy can be employed across a plurality of tape libraries. Additionally, a plurality of different tape expiration strategies may be employed for a single tape storage library such as the tape storage library depicted in FIG. 1A. The tape expiration process may be employed with other types of long term storage systems, including hard disk systems, R/W CD-ROM, RAID systems, or any other suitable system.

Figure 2:
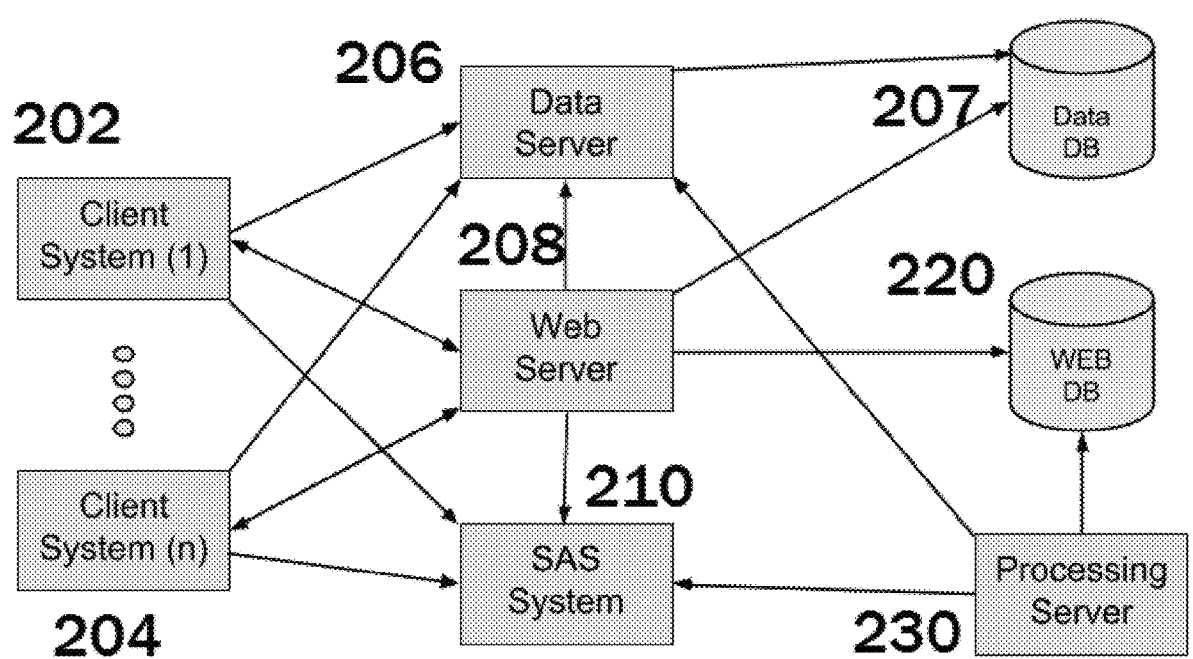
FIG. 2 shows an exemplary system for snap shot management.

FIG. 2 shows an exemplary system for snap shot management. In this system, a plurality of client devices 202-204 communicates with a data server 206, a web server 208, and a SAS system 210. The data server 206 and web server 208 communicate with a data store 207. The web server 208 also communicates with a web database 220. A processing server 230 in turn communicates with the web database 220, the data server 206 and the SAS system 210.

Figure 3:
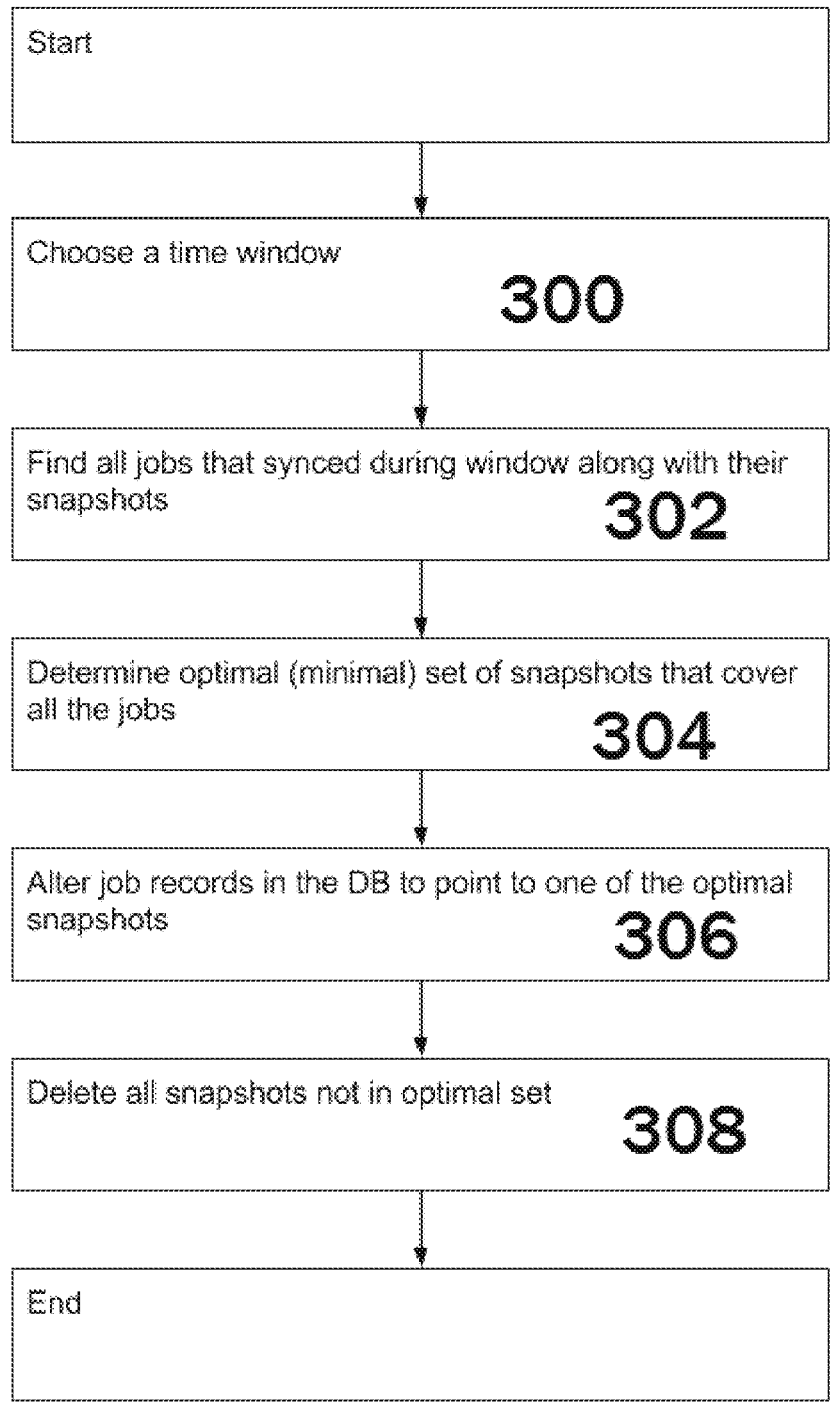

FIG. 3 shows an exemplary process for performing snapshot management. First, the process determines a time window (300). Next, the process determines all jobs that synced during the time window along with the snapshots that happened at the end of each job sync (302). The process then determines an optimal set of snapshots that cover all jobs (304). In one embodiment, the optimal set is the minimal set of snapshots that cover all jobs. Next, the process alter job records in the database to point to one of the optimal snapshots (306) and deletes all snapshots not in the optimal set (308).

Each customer organization is assigned some number of volumes, each with substantial disk space, on a commercial serial attached SCSI (SAS) system. One embodiment uses Solaris boxes running ZFS. The customer's systems are configured with jobs: specific data sets scheduled to sync to volume(s) at regular time intervals. Often, multiple systems are synced onto a single volume, separated in system directories. The job data on the volume remains unchanged between the end of the job's previous sync and start of the job's next sync. ZFS snapshots are taken in order to preserve the data at specific points in time, which capture the state of the whole volume, not individual systems. At the end of each job's sync, a snapshot is taken of the whole volume, but data about the specific system, the name of the snapshot, and the contents of the sync are stored in a database table for lookup to indicate a complete and valid set of that data. Snapshots taken during a sync will have files in partial states of writing, leading to incomplete or corrupted data that cannot be reliably restored. Creating snapshots has low overhead and is quick, but as the data changes over time with each subsequent sync, snapshots (which store the differences between the data when it was taken and the data now) grow in size. Due to this, deleting snapshots can have high overhead and be slow, as they are often not deleted until months or years later.

Many systems can sync to a volume, and many volumes belonging to many customer organizations can live on the SAS system, and the SAS system is handling all the snapshot creation and deletion requests, creating a bottleneck. Furthermore, customers are billed on the amount of disk space they are using on their collected volumes, which includes the synced data and the snapshots of that data. The proposed workflow will optimize the amount of space used on each volume (and thus lower customer bills), and reduce load on the SAS systems themselves by minimizing the number of volume-wide snapshots kept over time.

A snapshot is volume-wide, so if few or no jobs are currently running, then a snapshot (which is volume-wide) taken at the end of one job can capture the complete, unchanged state of data from multiple or all earlier job syncs. For example, Job A finishes at 7:45 PM and takes Snapshot A. Job B finishes at 8:00 PM and takes Snapshot B. Job A won't run again until 7:30 PM the next night, so its data will remain unchanged on the volume until then. Because Snapshot B came after the end of Jobs A and B, it covers the complete, unchanging data from both, and we could alter the database for Job A to point to Snapshot B (instead of Snapshot A), and delete Snapshot A from the volume. Now the database will show Job A and Job B pointing to Snapshot B as the holder of a complete set of data from both jobs.

At the end of each job, the system takes a volume-wide snapshot, and store a top-level listing of the job contents along with the creation time and name of the snapshot. After some amount of time (perhaps the beginning of the next UTC calendar day), inside a time window of some amount of time (perhaps the previous 5 days) find all snapshots on each volume and also find all jobs on each of those volumes. Figure out which sets of data from which job syncs have remained unchanged during each snapshot. Then determine the minimum set of snapshots that covers every sync during the time window, adjust the database so that each run sync points to one of the chosen snapshots in that set, and delete all snapshots not in that set from the volume.

By deleting snapshots when they are still fairly new, they should be small and produce low overhead on the SAS system to remove them. This roll-off workflow can also be scheduled to run during times of day when few syncs run, further lowering overhead.

FIG. 4 shows another exemplary process for snap shot management. The process is as follows:

Determine start and end of time window (402)

Get all available post-sync snapshots created during that time window (404)

Get all job syncs that started and/or ended during that time window (406)

Match snapshots to the sync jobs that triggered them (408)

For each snapshot, look at each job, and find the last job sync that ended that it covers before the next job sync began. This provides a list of which snapshots cover which job syncs (410)

Order job syncs by how many snapshots cover them, from least to most (412)

Make a checklist of all job syncs (414)

While there are unchecked job syncs (416)

For each unchecked job sync, starting with the least-covered job sync, continuing for all job syncs with the same level of coverage, get all covering snapshots (418)

Of those, record the snapshot that covers the most job syncs (440)

For each job sync that the snapshot covers, check it off the list (422)

For each job sync database row that isn't already pointing to one of the recorded snapshots, get the snapshots that cover its job sync, then pick the one (or one of several) that is in the recorded set, and update the row to point to the recorded snapshot (424)

For each snapshot not in the recorded set, delete the snapshot (428).

Figure 5A:
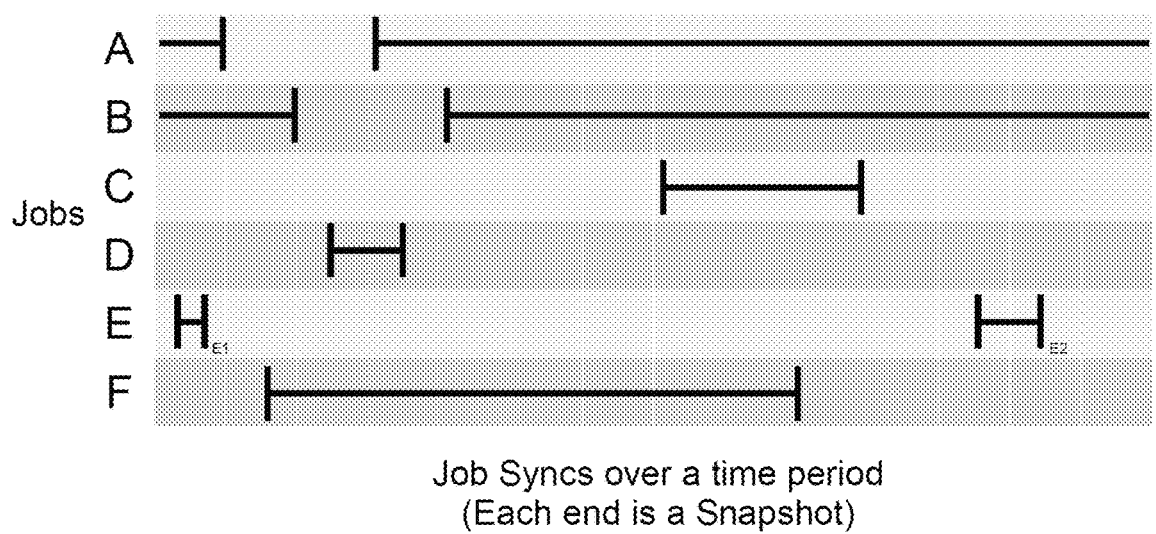

FIGS. 5A-5B show exemplary diagrams relating to snapshot management. The timeline diagrams indicate several syncs over a period of time (the exact period is irrelevant, as the process can work over any time range). The jobs are listed with letters, and some of the jobs run multiple times in the time period. The lines with the stops |------| indicate a running job, during which the data may be changing. Snapshots work best when data is complete and unchanged, so snapshots are taken at the end of each job - - - - |.

Turning now to FIGS. 5A-5B, Job A finishes early in the timeline, and Job B finishes shortly thereafter. When Job A ends, it takes Snapshot A. Ignoring the other jobs for a moment Snapshot A is valid for only Job A because Job's B's data is still changing. When Job B finishes, it takes Snapshot B. The time between when Job A finished and Job B finished, Job A's data has not changed, so while Snap A covers only Job A, Snap B covers both Job A and Job B. The diagram on the right with the XX's has those Jobs on the x-axis and the actual Snapshots on the Y-axis. Examining the 4 squares in the upper left (for just A and B), Snap A is X'd for Job A but not Job B. Snap B is X'd for both Jobs A and B. The operation is applied to the rest of the jobs in the timeline diagram to fill out the XX diagram in FIG. 5. Then the system examines the XX diagram and apply the process of FIG. 4 to determine the optimal set of snapshots, and unneeded snapshots are deleted to save disk space and improve access speed.

Figure 6:
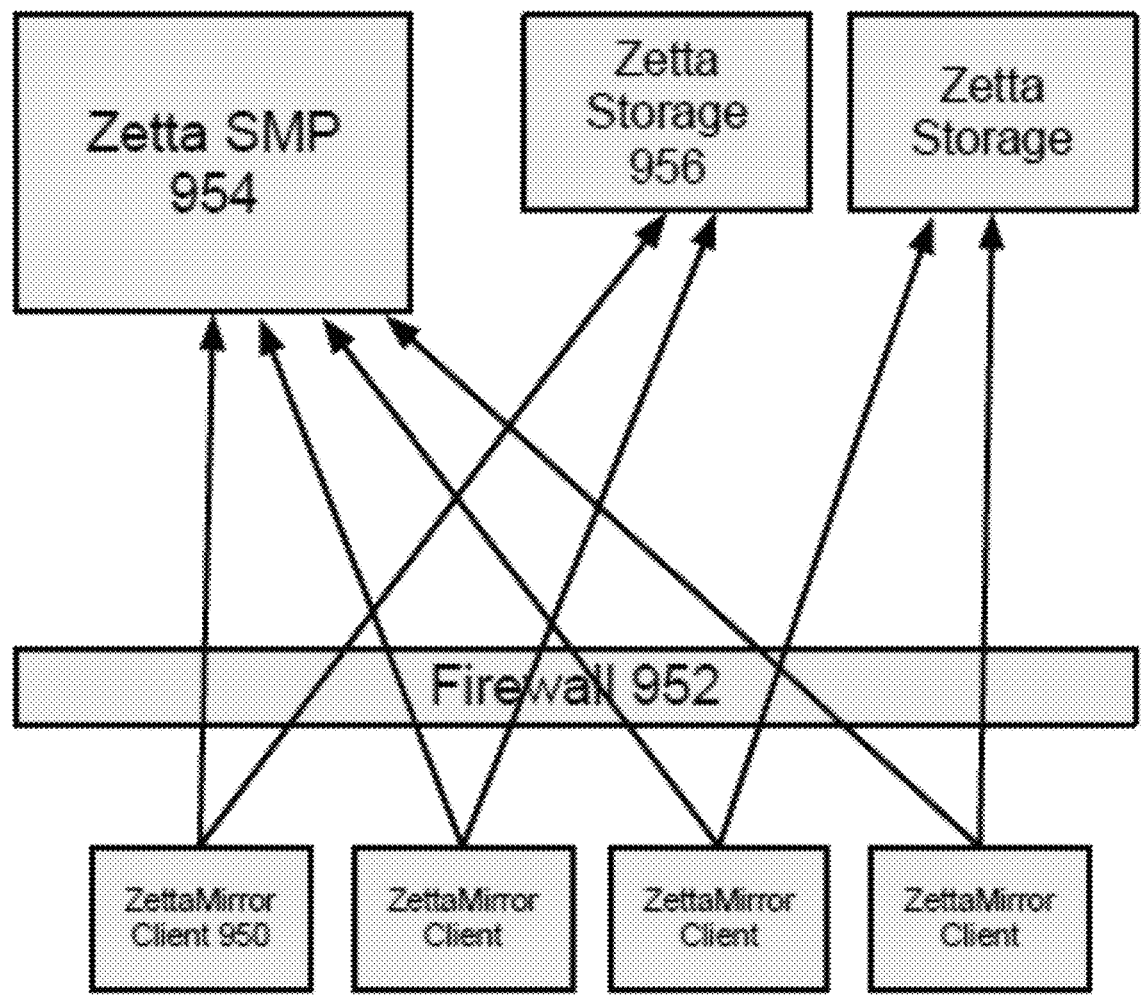
FIG. 6 shows an exemplary system for managing customer clients.

FIG. 6 shows an exemplary approach for managing customer clients. The design goal is to create a network of clients that are centrally controlled and monitored while requiring a minimum of changes to a customer's network topology. The system has a plurality of clients 950 such as ZettaMirror clients communicating through Firewall 952 to the SMP 954 and one or more storage silos 956. ZettaMirror clients are installed by a customer on each machine that requires a backup. After registration the client registers itself as a service and runs continuously on the host machine. The client service initiates a connection to the Zetta SMP using secure HTTP over SSL. Whenever the SMP wishes to send a command to the client the existing HTTP connection is used. The client will periodically refresh the HTTP connection to prevent it from getting stale and will automatically reconnect whenever the connection is lost. If for whatever reason the SMP is unavailable the client will continue to try and connect on a periodic basis until the SMP can be reached. Status information is also sent via output HTTPS connections but sent to a separate service URL, this can be done in parallel with the control connection. The control connect is used to send the client a schedule for when it should perform backup, sync or other actions. The schedule can be used to initiate a timed action even if the control connection is unavailable when the timed action is set to fire. As long as the remote storage is available the sync or backup can proceed as normal. This isolates SMP failures from interrupting the sync or backup schedules.

Using the above methodology the client never needs to accept an incoming TCP connection, but is always available to be sent a control message. All of the clients connect over the public internet or via private leased lines to a centralized SMP cluster and are able to be managed through a single interface.

The system data protect service is designed to be as simple as possible to configure and operate. The system enables a high performance cloud storage that looked and performed like a storage appliance. A real file system back end allows the system to offer a replication solution that is far more powerful than just backup. The system volume is mountable similar to a network attached storage system within existing enterprises. This allows for greater flexibility and true disaster recovery and archive functionality. The system is a three in one solution that offers greater functionality than traditional backup while replacing existing enterprise backup solutions.

A standards based file access protocol is used. The system supports the WebDav file access protocol which allows for file access from a large variety of third party software products including native access within Windows and Mac. WebDav is an internet friendly protocol built upon HTTP that incorporates encryption and WAN efficiency as well as a wide range of file operations to support remote file system operations. Through this technology, customers are able to mount a network drive on a desktop or server and directly access the system archives, including snapshot versions.

The system supports and requires encryption for every interaction with the system service. HTTPS and SSL, is required for all interaction with the service and is used to secure all file transfers. Additionally, all files stored are encrypted at rest with file encryption techniques originally designed for military and government use.

The system readily syncs very large data sets. Very large data sizes with large files (50 TB or more) as well as data sets with tens of millions of small files are both handled through a combination of technologies which support:

Rapid and efficient change detection for large numbers of files (See "Manifest") Only changed files to be examined for possible transfer.

Sub-file change detection reduces the amount of data that needs to be sent.

Compressible data is compressed and the end result is checksummed against the original to detect errors.

WAN efficient protocols that can efficiently utilize any available size, internet connection.

Configurable parallelism for multi-processor efficiency and high latency connections, or backing up NAS/SAN or RAID arrays with multiple disks Fast back end. The file servers are optimized for the application and are able to receive data very quickly. Single data silos can obtain write speeds of hundreds of MB/sec. Restores represent less than 1% of the load and are exceptionally fast due to a surplus of read IOPS and bandwidth.

The system is extremely efficient at iterating and detecting individual changes scattered throughout very large data sets. The manifest technology can scan and detect changes within single data sets with many files, even over 100 million files in one embodiment. The system is able to do this without causing significant memory, CPU, or mass storage IO load on the host system. The system has a scan rate capable of running within small backup windows.

The data mover can transfer data over the internet at the maximum possible speed. The system can handle sub-file change detection. Many programs, databases in particular, continuously update existing files. Many backup programs are forced to reimage the entire file even if only a small portion of it has changed. The system keeps a small signature of every large file that it encounters and is able to use that signature efficiently to find blocks within changed files that have real differences. The change detection is able to detect blocks changed in place, data added to the end of files and data shifts. The system has optimized the algorithm to be especially efficient for databases and to use a minimum of signature storage space. A digital signature is generated on every file. Every file that enters the system backend system is checksummed using the SHA1 cryptographic hash algorithm. The checksum is stored separately from each file and can be referenced as a method of verifying that the data stored at The system is still valid. The client software uses this checksum to perform end to end verification of data integrity and the system backend is also able to use the checksum for data scrubbing purposes.

SHA-1 is a cryptographic hash function designed by the United States National Security Agency and published by the United States NIST as a U.S. Federal Information Processing Standard. SHA stands for "secure hash algorithm". The four SHA algorithms are structured differently and are distinguished as SHA-0, SHA-1, SHA-2, and SHA-3. SHA-1 is the most widely used of the existing SHA hash functions, and is employed in several widely used applications and protocols. SHA-3, was announced on Oct. 2, 2012.SHA-1 produces a 160-bit message digest based on principles similar to those used by Ronald L. Rivest of MIT in the design of the MD4 and MD5 message digest algorithms, but has a more conservative design. The original specification of the algorithm was published in 1993 as the Secure Hash Standard, FIPS PUB 180, by US government standards agency NIST (National Institute of Standards and Technology). This version is now often referred to as SHA-0.

Each incremental change is applied to a full in such a way that a new full is generated. Using snapshot technology the system is able to keep a configurable number of full backups, space efficiently and with instant access and no rebuild time. Additionally, since a new full is generated after every backup, the system never needs to take a new full backup, which saves even more time. The net effect is that any file from any version is instantly available for restoring from the system.

Snapshots represent an immutable and verifiably correct representation (because the snapshots also contain the SHA1 hashes) of the source data. The snapshots are space efficient such that if 128 k of a 10 MB file changes (after one or more snapshots were taken) the total space utilized is only 10 MB+128 k (plus small amount of overhead). Each snapshot only grows the total data set size by the amount of unique data that changed during that period. The system is able to emulate traditional tape rotation schedules through snapshot promotion, walking through 30 dailies, 12 monthlies, and as many yearly snapshots as required.

The system backend creates snapshots on both a scheduled basis as well as "snap after sync," for data consistency. Snapshots are a point in time "frozen," version of the file system. For databases, but also other types of applications, going through and copying up file by file doesn't work because more than a single file needs to be captured at a single point in time (imagine a book where each page is a file, any time a page was updated or inserted the index or table of contents would need to be updated as well). The system supports VSS snapshots on the Microsoft platform on the client side as a method of freezing the source data. Finally, snapshots power a geo-diverse replication.

The system protects service along with agents that allow for complete automation of the backup/DR process. The end to end nature of the system service and the lack of any required client side appliances allows for complete automation with no customer level intervention. Legacy based backup systems are notorious for breaking easily and requiring weekly intervention. The system Service architecture detects and automatically fixes most common problems. The system employs two different automatic upgrade systems. The backend service is upgraded automatically and usually with zero downtime. All service upgrades, disk failures, storage upgrades, networking, among others, are handled by the system with no customer involvement necessary. The system's agents also are capable of a fully automated upgrade process or one controlled by the end user at their discretion. All commonly deployed windows versions, multiple mac versions and a plurality of versions of Linux are supported by the system. A file system abstraction layer allows for all meta data to be stored in a platform neutral way on a single customer volume allowing for mixed used in a heterogeneous environment. All the clients are managed in a common way through the web based configuration platform further reducing complexity in a heterogeneous environment.

The system uses light weight agents and a SAS backend to replace existing heavyweight hardware solutions. Customers can sign up, provision and deploy within minutes rather than months. Additionally, since there is no hardware to maintain, most customer problems can be solved proactively by support personnel or over the phone.

The Web-based System Management Portal (SMP) is used to manage, configure, recover and report on data protection jobs—The system's web based configuration portal technology allows for the configuration and management of customer systems in a single place from a single sign-on. All system status is available from a single page and is greatly simplified over traditional distributed systems. The single portal concept is a "must have" feature for busy system administrators and makes the entire system deployment, configuration and maintenance experience seamless and easy.

The system supports multiple methods for customer restores based on the customer need at the time. The system agent performs batch restores of large numbers of files using the same techniques used to backup the data. A la carte restores are possible through a web based file browser that replicates the look and feel of a native file explorer. The system's mount capability offers even more flexibility for the customer. By mounting the system storage volume on a desktop or server, the customer can have read only on demand access to any version of their backed up files.

The system's customers receive daily digest reports that summarize customer activity allow customers to know that everything is protected without having to actively monitor the system. The system has native database backup and restore software to make the process simple and automated. The system's MS-SQL backup connector automatically checkpoints the database, writes a current copy, detects and uploads the sub file changes and allows for a local copy to be saved on any available direct attached or network attached file system.

The system's Netapp replication product can perform a near equivalent Snap Mirror replication without the need to purchase SnapMirror, another Netapp appliance, and set up another data center. The system is able to create and replicate NetApp snapshots and recreate the snapshots—identically— on the system backend service. Customers can reap the benefits of SnapMirror for a small fraction of the cost and can simultaneously reduce vendor lock in for their storage appliance.

The use of a real file system back end allows the system to offer a replication solution that is far more powerful than just backup. The system volume is mountable similar to a network attached storage system within existing enterprises. This allows for greater flexibility and true DR and archive functionality. The system is a three in one solution that offers greater functionality than traditional backup while replacing existing enterprise backup solutions. The system supports the WebDav file access protocol which allows for file access from a large variety of third party software products including native access within Windows and Mac. Webdav is an internet friendly protocol built upon HTTP that incorporates encryption and WAN efficiency as well as a wide range of file operations to support remote file system operations. Through this technology, customers are able to mount a network drive on a desktop or server and directly access the system archives, including snapshot versions. The system supports and requires encryption for every interaction with the system service. HTTPS and SSL, which were invented and standardized by the company co-founders, is required for all interaction with the service and is used to secure all file transfers. Additionally, all files stored at the system are encrypted at rest with file encryption techniques originally designed for military and government use. The system readily syncs very large data sets. Very large data sizes with large files (50 TB or more) as well as data sets with tens of millions of small files are both handled through a combination of technologies which support:

Rapid and efficient change detection for large numbers of files (See "Manifest") Only changed files to be examined for possible transfer.

Subfile change detection reduces the amount of data that needs to be sent.

Compressible data is compressed and the end result is checksummed against the original to detect errors.

Wan efficient protocols that can efficiently utilize any available size internet connection.

Configurable parallelism for multi processor efficiency and high latency connections, or backing up NAS/SAN or RAID arrays with multiple disks Very fast back end. Our file servers are optimized for our application and are able to receive data very quickly. Single data silos can obtain write speeds of hundreds of MB/sec. Restores represent less than 1% of the load and are exceptionally fast due to a surplus of read TOPS and bandwidth.

The system developed its "manifest" technology to be able to scan and detect changes within single data sets with hundreds of million files. The system is able to do this without causing significant memory or CPU load on the host system and has a scan rate capable of running within small backup windows. The WAN optimized data mover efficiently moves data over the internet at the maximum possible speed. The first versions were designed by one of the original architects of the HTTP protocol and embodied more than a decade of experience in WAN optimization to achieve greater than Gb/sec speeds.

Many programs, databases in particular, continuously update existing files. Many backup programs are forced to reimage the entire file even if only a small portion of it has changed. The system keeps a small signature of every large file that it encounters and is able to use that signature efficiently to find blocks within changed files that have real differences. The change detection is able to detect blocks changed in place, data added to the end of files and data shifts. The system has optimized the algorithm to be especially efficient for databases and to use a minimum of signature storage space.

A Digital Signature is saved on every file—Every file that enters the system backend system is checksummed using the SHA1 cryptographic hash algorithm. The checksum is stored separately from each file and can be referenced as a method of verifying that the data stored at the system is still valid. The system uses this checksum to perform end to end verification of data integrity and the system backend is also able to use the checksum for data scrubbing purposes.

Reverse incremental backups can be done. Traditional incremental backups are known for substantially reducing the time for nightly backups. Incrementals only backup the files that have changed and store them in a changeset. The problem with most incremental technologies is that restores need to be built up from the last full plus any and all incrementals. The restore process can take a very long time to rebuild the state just to get to the point where you can restore a single file. The system takes a different approach. At The system each incremental change is applied to a full in such a way that a new full is generated. Using our snapshot technology we are able to keep a configurable number of full backups, space efficiently and with instant access and no rebuild time. Additionally, since a new full is generated after every backup the system never needs to take a new full backup, which saves even more time. The net effect is that any file from any version is instantly available for restoring from the system.

The system backend creates snapshots on both a scheduled basis as well as "snap after sync," for data consistency. Snapshots are a point in time "frozen," version of the file system. For databases, but also other types of applications, going through and copying up file by file doesn't work because more than a single file needs to be captured at a single point in time (imagine a book where each page is a file, any time a page was updated or inserted the index or table of contents would need to be updated as well). The system supports VSS snapshots on the Microsoft platform on the client side as a method of freezing the source data. Finally, snapshots power our geo-diverse replication. Snapshots, as an immutable and verifiably correct representation (because the snapshots also contain the SHA1 hashes) of the source data, enables our solutions in the SEC 17a-4 compliance space for broker/dealers. In one embodiment, the snapshots are space efficient such that if 128 k of a 10 MB file changes (after one or more snapshots were taken) the total space utilized is only 10 MB+128 k (plus small amount of overhead). Each snapshot only grows the total data set size by the amount of unique data that changed during that period. The system is able to emulate traditional tape rotation schedules through snapshot promotion, walking through 30 dailies, 12 monthlies, and as many yearly snapshots as required.

The data protect service along with agents that allow for complete automation of the backup/DR process. The end to end nature of the system service and the lack of any required client side appliances allows for complete automation with no customer level intervention. Legacy based backup systems are notorious for breaking easily and requiring weekly intervention. The system Service architecture detects and automatically fixes most common problems.

The system employs two different automatic upgrade systems. The backend service is upgraded automatically and usually with zero downtime. All service upgrades, disk failures, storage upgrades, networking, among others, are handled by The system with no customer involvement necessary. The system agents also are capable of a fully automated upgrade process or one controlled by the end user at their discretion.

The system uses light weight agents and a SAS backend to replace existing heavyweight hardware solutions. Customers can sign up, provision and deploy within minutes rather than months. Additionally, since there is no hardware to maintain, most customer problems can be solved proactively by system support personnel or over the phone. The system maintains a full end-to-end solution.

The Web-based System Management Portal (SMP) to manage, configure, recover and report on data protection jobs—The system's web based configuration portal technology allows for the configuration and management of customer systems in a single place from a single sign-on. All system status is available from a single page and is greatly simplified over traditional distributed systems. The single portal concept is a "must have" feature for busy system administrators and makes the entire The system deployment, configuration and maintenance experience seamless and easy.

A simple and flexible restore process is provided. The system supports multiple methods for customer restores based on the customer need at the time. The system's agent performs batch restores of large numbers of files using the same techniques used to back up the data. A la carte restores are possible through a web based file browser that replicates the look and feel of a native file explorer. The system's mount capability offers even more flexibility for the customer. By mounting the system storage volume on a desktop or server, the customer can have read only on demand access to any version of their backed up files.

The user and system support staff receive daily digest reports that summarize customer activity allow customers to know that everything is protected without having to actively monitor the system.

Enterprise connectors are provided for Databases—Databases require a complex series of steps in order to backup and restore. The system has developed native database backup and restore software to make the process simple and automated. The system MS-SQL backup connector automatically checkpoints the database, writes a current copy, detects and uploads the sub file changes and allows for a local copy to be saved on any available direct attached or network attached file system.

The system's Netapp replication product can perform a near equivalent Snap Mirror replication without the need to purchase SnapMirror, another Netapp appliance, and set up another data center. The systemMirror is able to create and replicate NetApp snapshots and recreate the snapshots—identically—on the The system backend service. Customers can reap the benefits of SnapMirror for a small fraction of the cost and can simultaneously reduce vendor lock in for their storage appliance.

The system was built from the ground up to scale to Trillions of objects at Exabyte scale and beyond. Each storage silo is horizontally scalable to near infinite number of nodes. The system configuration and management system ties the nodes together in a shardable and easily scalable way to support potentially millions of volumes and organizations. The Authentication and networking infrastructure is based around industry standard mechanisms that Netscape helped to establish in the 90's and have proven to scale to internet wide levels.

The system has custom built the billing metrics systems using traditional SQL database methodology to produce a very reliable yet scalable system. The system can support a large number of flexible subscription billing features.

The system has built a fully automated provisioning system that allows for new customer signup and service delivery with no human interaction. This allows for complete automation of the customer acquisition process, partner provisioning of new customers and the ability for customers to add additional separate storage volumes directly through our web based configuration platform. The customer is able to choose the desired location of the new volume from a geographic list of The system data centers. The system can increase operational efficiency and allows for rapid growth. The storage volumes are provisioned from multiple sets of available physical storage that are expanded just ahead of demand based on growth projections.

Geographically Diverse Data Centers are used for disaster recovery purposes. Two first-class shared-nothing facilities provides for a geo-replication option. With geo-replication, the customer receives two volumes, one primary (read/write) and one secondary (read only). Read access to the secondary is available continuously. Replication is based on snapshots which fire on a timer, typical propagation delay is about 4 hours in one implementation. All logical management is done remotely, and only technician level personnel are required locally.

Shared Nothing Data Protection can be provided to customers who do not elect the Geo-diverse replication option. Their data is replicated to a second, shared-nothing storage silo. From an application point of view, it is the same process as the geo-replication, except it is going to a local target. Customers do not have access to this data set and additional file system compression is enabled, but it is there to prevent against logical corruption issues.

Aside from application metrics, several thousand system metrics are monitored, ensuring awareness of system problems in real time. The system has extended monitoring of disk drives, and frequently proactively pre-fails them when they show excessive read or write errors or other indications of a failing drive.

It will also be recognized by those of ordinary skill in the art of computer programming that the method of FIG. 1A-1B and the functional modules of the remaining figures may be embodied as a series of instructions organized into one or more computer programs which are executable by a programmable control device. A programmable control device may be a single computer processor, a plurality of computer processors coupled by a communications link, or a custom designed state machine. Custom designed state machines may be embodied in a hardware device such as a printed circuit board comprising discrete logic, specially designed application specific integrated circuits (ASICs), or integrated circuits such as field programmable gate arrays (FPGAs). Storage devices suitable for tangibly embodying computer programs include all forms of non-volatile memory including, but not limited to: semiconductor memory devices such as electrically programmable read only memory (EPROM), electrically erasable programmable read only memory (EEPROM), and flash devices; magnetic disks (fixed, floppy, and removable); other magnetic media such as tape; and optical media such as CD-ROM disks.

While the invention has been disclosed with respect to a limited number of embodiments, numerous modifications and variations will be appreciated by those skilled in the art. It is intended, therefore, that the following claims cover all such modifications and variations that may fall within the true spirit and scope of the invention.

What is claimed is:

1. A method, comprising:
    selecting a selected client computer system from a plurality of computer systems to backup to a cloud storage;
    choosing a time window to back up the selected client computer to a disk volume with a retention schedule in the cloud storage;
    performing a job sync by synching the selected client computer during the time window and writing data to the disk volume in the cloud storage;
    upon completion of job synch of the selected client computer, taking a snapshot of the disk volume in the cloud storage while recording a record, for a predefined time period, data representative of snapshots triggered by the job synch in a database associated with the job syncs, the data representative of the snapshots triggered by the job sync comprises a start time, an end time, data synched, and metadata;
    consolidating snapshots to a minimal set of the job syncs by retaining a most recent snapshot while deleting previous snapshots;
    determining an optimal set of snapshots that cover sync jobs for the client computer by disk volume for the desired retention schedule by ordering job syncs by snapshot coverage, and determining a first snapshot covered by a second snapshot that is later than the first snapshot;
    altering a record in the database to change a row pointing to the first snapshot to point to the second snapshot; and
    deleting the first snapshots.

2. The method of claim 1, further comprising determining a start and end of the time window.

3. The method of claim 1, further comprising determining job syncs that one of a group consisting of started Grand ended during the time window.

4. The method of claim 1, further comprising matching a snapshot to a sync job that triggered the snapshot.

5. The method of claim 1, further comprising determining for a snapshot, a last job sync that ended before a next job sync began and generating a list of which snapshots cover which job syncs.

6. The method of claim 1, further comprising ordering job syncs by a number of snapshots covering the job syncs.

7. A tangible, non-transitory computer readable medium with instructions encoded thereon for execution by a processor, the instructions when executed are operable to:
    choosing a time window to back up a client computer to a disk volume with a desired retention schedule to a cloud storage;
    performing a job sync of the client computer during the time window and writing data to the disk volume;
    upon completing a job sync, taking a snapshot of the disk volume in the cloud storage, while recording a record for a predetermined time period of the snapshot information in a job sync database, the snapshot information comprises a start time, an end time, data synced, and metadata;
    checking the desired retention schedule for multiple entries for the predetermined time period of snapshot information stored in the database;
    consolidating snapshots to a minimal set of job syncs with a most recent snapshot;
    ordering job syncs from by snapshot coverage;
    determining an optimal set of snapshots that cover sync jobs for the client computer by disk volume for the desired retention schedule by ordering job syncs by snapshot coverage, and determining a first snapshot covered by a second snapshot that is later than the first snapshot;
    altering a record in the database to change a row pointing to the first snapshot to point to the second snapshot; and
    deleting the first snapshots.

8. The computer readable medium of claim 7, further comprising instructions for determining a start and end of the time window.

9. The computer readable medium of claim 7, further comprising instructions for ordering job syncs by the number of snapshots covering the job syncs.

10. The computer readable medium of claim 7, further comprising instructions for determining job syncs that one of group started and ended during the time window.

11. The computer readable medium of claim 7, further comprising instructions for matching snapshots to the sync jobs.

12. The computer readable medium of claim 7, further comprising instructions to determine for a snapshot a last job sync that ended before a next job sync began and generating a list of which snapshots cover which job syncs.

13. The computer readable medium of claim 7, further comprising instructions for ordering job syncs by a number of snapshots covering the job syncs.

14. The computer readable medium of claim 7, further comprising instructions for obtaining available post-sync snapshots created during the time window.

15. The computer readable medium of claim 7, further comprising instructions for matching snapshots to the sync jobs that triggered the snap shots.

* * * * *